(12) United States Patent
Gambill et al.

(10) Patent No.: US 12,388,288 B2
(45) Date of Patent: Aug. 12, 2025

(54) UPS OVERLOAD TIME REMAINING CALCULATION BASED ON AN ADAPTIVE MINIMUM ENVELOPE FILTER

(71) Applicant: Vertiv Corporation, Columbus, OH (US)

(72) Inventors: Matthew Gambill, Westerville, OH (US); Xian Chen, Columbus, OH (US)

(73) Assignee: Vertiv Corporation, Westerville, OH (US)

( * ) Notice: Subject to any disclaimer, the term of this patent is extended or adjusted under 35 U.S.C. 154(b) by 0 days.

(21) Appl. No.: 17/826,642

(22) Filed: May 27, 2022

(65) Prior Publication Data

US 2022/0416567 A1    Dec. 29, 2022

Related U.S. Application Data

(60) Provisional application No. 63/194,414, filed on May 28, 2021.

(51) Int. Cl.
  *H02J 9/06* (2006.01)
  *H02J 7/00* (2006.01)

(52) U.S. Cl.
  CPC .............. *H02J 9/06* (2013.01); *H02J 7/0048* (2020.01)

(58) Field of Classification Search
  CPC ................................. H02J 9/06; H02J 7/0048
  See application file for complete search history.

(56) References Cited

U.S. PATENT DOCUMENTS

| 5,781,448 A | * | 7/1998 | Nakamura | H02J 9/061 |
| | | | | 307/64 |
| 8,493,696 B2 | | 7/2013 | Komatsuzaki | |
| 9,633,359 B2 | * | 4/2017 | Monforte | G06Q 10/06 |

(Continued)

FOREIGN PATENT DOCUMENTS

| CN | 101427459 B | * | 3/2012 | ........... H03F 1/0222 |
| CN | 105322621 A | | 2/2016 | |

(Continued)

OTHER PUBLICATIONS

European Search Report received in EP Application No. 22812326, Mar. 25, 2025, 6 pages.

*Primary Examiner* — Lincoln D Donovan
*Assistant Examiner* — James G Yeaman
(74) *Attorney, Agent, or Firm* — Suiter Swantz IP

(57) ABSTRACT

A power control system may include an uninterruptible power supply (UPS), a display device, load measurement circuitry to determine a load percentage of the UPS, and a controller. The controller may receive the load percentage of the UPS from the load measurement circuitry; monitor the load percentage of the UPS to determine whether the UPS is operating in a nominal load state or an overload state; generate an input overload countdown timer when the UPS is operating in the overload state, where the input overload countdown timer provides an estimated time remaining in the overload state; generate an output overload countdown timer by applying a minimum envelope filter to the input overload countdown timer; and direct the display device to display the output overload countdown timer. Additionally, the minimum envelope filter may be operated in an open-loop or a closed-loop configuration.

20 Claims, 19 Drawing Sheets

(56) References Cited

U.S. PATENT DOCUMENTS

| | | |
|---|---|---|
| 9,705,310 B2 | 7/2017 | Pfitzer et al. |
| 2003/0048006 A1 | 3/2003 | Shelter, Jr. et al. |
| 2005/0030045 A1 | 2/2005 | Deng et al. |

FOREIGN PATENT DOCUMENTS

| | | | | |
|---|---|---|---|---|
| CN | 107947122 A | * | 4/2018 | ........... H02H 7/1227 |
| CN | 111161097 A | * | 5/2020 | ............. G06Q 50/06 |

* cited by examiner

UPS OVERLOAD TIME REMAINING CALCULATION BASED ON AN ADAPTIVE MINIMUM ENVELOPE FILTER

CROSS-REFERENCE TO RELATED APPLICATION

The present application claims the benefit under 35 U.S.C. § 119(e) of U.S. Provisional Application Ser. No. 63/194,414, filed May 28, 2021, entitled UPS OVERLOAD TIME REMAINING CALCULATION BASED ON AN ADAPTIVE MINIMUM ENVELOPE FILTER, naming Matthew Gambill and Xian Chen as inventors, which is incorporated herein by reference in the entirety.

TECHNICAL FIELD

The present disclosure relates generally to overload management for an uninterruptible power supply (UPS) and, more particularly, to providing a smooth overload time remaining countdown.

BACKGROUND

An uninterruptible power supply (UPS) may typically operate above a rated nominal load condition (e.g., in an overload condition) for a certain period of time based on various factors including the load percentage or the amount of time in an overload condition. When such an overload condition occurs, it may be desirable to provide a countdown timer of an expected duration of the overload condition such that a user may evaluate, monitor, or respond to the overload condition. A typical overload countdown time may typically be based on factors such as the load percentage calculation. However, temporal fluctuations in a load percentage calculation based on load bank fluctuation (e.g., voltage and/or current fluctuations), analog to digital conversion (ADC) measurements error, sensor accuracy, or the like may result in substantive fluctuations in the overload countdown time (e.g., rapid fluctuations between timescales of minutes or hours) that may negatively impact the utility of the overload countdown timer. There is therefore a need to develop systems and methods to cure the above deficiencies.

SUMMARY

A system is disclosed in accordance with one or more illustrative embodiments of the present disclosure. In one illustrative embodiment, the system includes an uninterruptible power supply (UPS). In another illustrative embodiment, the system includes load measurement circuitry to determine a load percentage of the UPS. In another illustrative embodiment, the system includes a controller. In another illustrative embodiment, the controller receives the load percentage of the UPS from the load measurement circuitry. In another illustrative embodiment, the controller monitors the load percentage of the UPS to determine whether the UPS is operating in a nominal load state or an overload state. In another illustrative embodiment, the controller generates an input overload countdown timer when the UPS is operating in the overload state, the input overload countdown timer providing an estimated time remaining in the overload state based on the load percentage. In another illustrative embodiment, the controller generates an output overload countdown timer by applying an envelope filter to the input overload countdown timer, where a value of the output overload countdown timer provided by the envelope filter corresponds to a selected value associated with the input overload countdown timer over a selected interval. In another illustrative embodiment, the controller directs a display device to display the output overload countdown timer and/or controls one or more additional components based on the output overload countdown timer.

A method is disclosed in accordance with one or more illustrative embodiments of the present disclosure. In one illustrative embodiment, the method includes receiving a load percentage of a UPS. In another illustrative embodiment, the method includes monitoring the load percentage of the UPS to determine whether the UPS is operating in a nominal load state or an overload state. In another illustrative embodiment, the method includes generating an input overload countdown timer when the UPS is operating in the overload state, the input overload countdown timer providing an estimated time remaining in the overload state based on the load percentage. In another illustrative embodiment, the method includes generating an output overload countdown timer by applying an envelope filter to the input overload countdown timer, where a value of the output overload countdown timer provided by the envelope filter corresponds to a selected value associated with the input overload countdown timer over a selected interval. In another illustrative embodiment, the method includes directing the display device to display the output overload countdown timer.

A system is disclosed in accordance with one or more illustrative embodiments of the present disclosure. In one illustrative embodiment, the system includes a UPS. In another illustrative embodiment, the system includes measurement circuitry configured to determine a battery capacity of the UPS. In another illustrative embodiment, the system includes a controller. In another illustrative embodiment, the controller receives the battery capacity of the UPS from the measurement circuitry. In another illustrative embodiment, the controller generates an input countdown timer, the input countdown timer providing an estimated battery time remaining based on the battery capacity. In another illustrative embodiment, the controller generates an output countdown timer by applying an envelope filter to the input countdown timer, where a value of the output countdown timer provided by the envelope filter corresponds to a selected value associated with the input countdown timer over a selected interval. In another illustrative embodiment, the controller directs a display device to display the output overload countdown timer and/or controls one or more additional components based on the output overload countdown timer.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1:
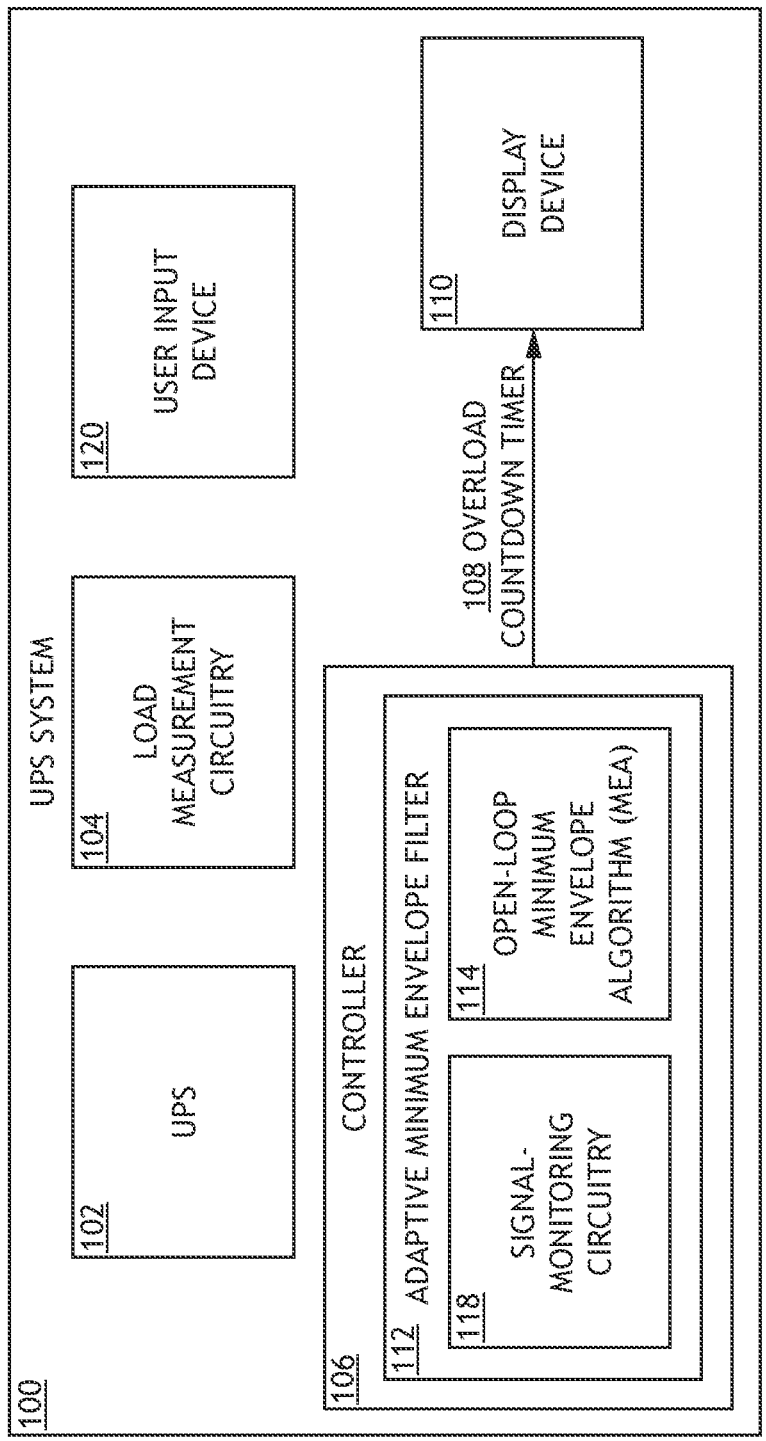
FIG. 1 is a conceptual block diagram view of an uninterruptible power supply (UPS) system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to providing an overload countdown time (or overload time remaining) for an uninterruptible power supply (UPS) using an adaptive minimum envelope filter. A UPS may include overload control circuitry designed to monitor its load percentage and provide an overload countdown timer indicative of an estimated time remaining in an overload condition based on this load control percentage. For example, the overload control circuitry may utilize measurements of various internal components of the UPS such as, but not limited to, internal resistors or inductors. However, it is contemplated herein that an overload countdown time based on an unfiltered load percentage calculation may exhibit substantive fluctuations in the time output that may limit the accuracy or reliability of the overload countdown timer.

Embodiments of the present disclosure are directed to an overload countdown timer incorporating an adaptive minimum envelope filter. For example, the overload countdown timer may provide an unfiltered overload time remaining signal, which may be based on any suitable overload estimation technique known in the art including, but not limited to, a load percentage determination. The overload countdown timer may then pass the unfiltered overload time remaining signal through an adaptive minimum envelope filter to provide an output overload countdown timer. It is contemplated herein that the adaptive minimum envelope filter may reduce or otherwise filter out noise from the unfiltered overload time remaining data with minimal phase shift, which would manifest as a time offset or other error in the output overload countdown timer. In this way, the use of the adaptive minimum envelope filter as disclosed herein may provide superior performance relative to existing techniques such as linear filters, which may introduce such unwanted phase shifts.

In some embodiments, the adaptive minimum envelope filter includes an open-loop minimum envelope filter that finds the minimum of an input signal (e.g., an unfiltered overload countdown signal) over a discrete time interval. Such an adaptive minimum envelope filter may be particularly efficient for, but not limited to, signals with a relatively small standard deviation and having an order of approximately $0(\sigma \cdot \log(\sigma))$, where $\sigma$ is the standard deviation of the input signal. Additionally, the operation of such an open loop technique may be tailored, customized, or otherwise optimized by selecting one or more parameters used in the algorithm such as, but not limited to, parameters related to a discrete time interval used for the minimum envelope determinations. For example, it may be the case that an amount of noise in the input signal may impact suitable values for such parameters required to achieve a desired level of performance (e.g., an output overload countdown signal having fluctuations within selected tolerances). Accordingly, values for such parameters may be selected by an operator based on a noise measurement of the input signal prior implementation or at selected intervals to update the parameters as necessary.

In some embodiments, the adaptive minimum envelope filter is a closed-loop filter. For example, the adaptive minimum envelope filter may include the open-loop minimum envelope filter and a feedback loop to control the values of one or more input parameters of the open-loop minimum envelope filter. For example, the feedback loop may control the value of the one or more input parameters based on an amount of noise in the input signal.

The adaptive minimum envelope filter may be implemented in a variety of hardware or software configurations. In some embodiments, the adaptive minimum envelope filter is implemented in a digital signal processor or microprocessor. In some embodiments, the adaptive minimum envelope filter is implemented using one or more field-programmable gate array (FPGA) devices. In some embodiments, the adaptive minimum envelope filter is implemented using one or more complex programmable logic devices (CPLDs).

The output of the adaptive minimum envelope filter may be utilized in a variety of ways within the system or external to the system. In some embodiments, the output of the adaptive minimum envelope filter is displayed on a display device. In this way, a user may take actions as necessary based on the output. In some embodiments, the output of the adaptive minimum envelope filter is used as a control signal to control one or more additional components external to a UPS such as, but not limited to, loads, load controllers, or input power controllers.

It is further contemplated herein that an adaptive minimum envelope filter as disclosed herein may provide numerous advantages over existing techniques. For example, an adaptive minimum envelope filter may filter out unwanted high-frequency white noise in an input signal with a minimal phase shift. Further, the adaptive minimum envelope filter may be implemented without changing existing control algorithms (e.g., for the generation of an unfiltered overload countdown timer) and may thus avoid the costs, substantive testing, and other burdens associated with regulatory testing of new or updated hardware or control algorithms. By way of another example, the adaptive minimum envelope filter may be compact, require relatively few resources, and may be relatively easily implemented using a variety of hardware configurations. By way of another example, the adaptive minimum envelope filter may provide a user with an overload countdown timer that is smoother, more robust, and more reliable than an unfiltered overload countdown timer.

Referring now to FIGS. 1-17 and Tables 1 and 2, the generation of an overload countdown timer based on an adaptive minimum envelope filtering technique is described in accordance with one or more embodiments of the present disclosure.

FIG. 1 is a conceptual block diagram view of a UPS system 100, in accordance with one or more embodiments of the present disclosure. In some embodiments, the UPS system 100 includes a UPS 102, load measurement circuitry 104 for measuring a load percentage of the UPS 102, and a controller 106 for generating an overload countdown timer 108. The UPS system 100 may further include a display device 110 to display the overload countdown timer 108 (e.g., to one or more users or operators).

The UPS 102 may include any UPS known in the art. Further, the load measurement circuitry 104 may monitor the load percentage of the UPS 102 using any technique known in the art. For example, the load measurement circuitry 104 may generate measurements of various internal components of the UPS 102 such as, but not limited to, internal resistors or inductors to provide a measurement or an estimate of the load percentage.

In some embodiments, the controller 106 generates the overload countdown timer 108 by first generating a raw overload countdown timer (not explicitly shown in FIG. 1) based at least in part on the load percentage of the UPS 102, applying an adaptive minimum envelope filter 112 to the raw overload countdown timer, and providing the result as the overload countdown timer 108. This raw overload countdown timer may be determined using any technique known in the art. For example, the raw overload countdown timer may be generated based on an estimation or measurement of the load percentage of the UPS and an associated table relating load percentage to an overload countdown timer value.

The adaptive minimum envelope filter 112 may be implemented using an open-loop or a closed-loop technique. In some embodiments, the adaptive minimum envelope filter 112 implements an open-loop minimum envelope algorithm (MEA) 114 that may accept one or more input parameters 116 (see e.g., FIG. 2 below) to tailor or otherwise control the operation of the open-loop MEA 114. For example, the input parameters 116 may include any parameters or values that may be selected or adjusted such as, but not limited to timescales, duty cycles, amplitude scales, counter reset points, or the like. In an open-loop configuration, the input parameters 116 are provided as set values during run-time, which may be selected based on expected raw overload countdown timer signals, measurements of previous raw overload countdown timer signals, fixed values, or manual input. In a closed-loop configuration, at least some of the input parameters 116 are controlled using signal-monitoring circuitry 118 that controls or otherwise selects values based on the raw overload countdown timer.

In some embodiments, the UPS system 100 includes a user input device 120 such as, but not limited to, a keyboard, mouse, or a touch-screen. In this way, a user may input values of one or more input parameters 116 in an open-loop configuration or adjust various aspects of the signal-monitoring circuitry 118 in a closed-loop configuration.

The controller 106 and/or the signal-monitoring circuitry 118 may include any number of processors or processing elements known in the art. For example, the controller 106 and/or the signal-monitoring circuitry 118 may include one or more processing or logic elements such as, but not limited to, one or more micro-processor devices, one or more digital signal processors (DSPs), one or more field programmable gate arrays (FPGAs), one or more complex programmable logic devices (CPLDs), or one or more application specific integrated circuit (ASIC) devices. The controller 106 and/or the signal-monitoring circuitry 118 may further include one or more memory devices. A memory device may further include any storage medium known in the art suitable for storing program instructions executable by the associated processors such as a non-transitory memory medium such as a read-only memory (ROM), or a random-access memory (RAM).

Figure 2:
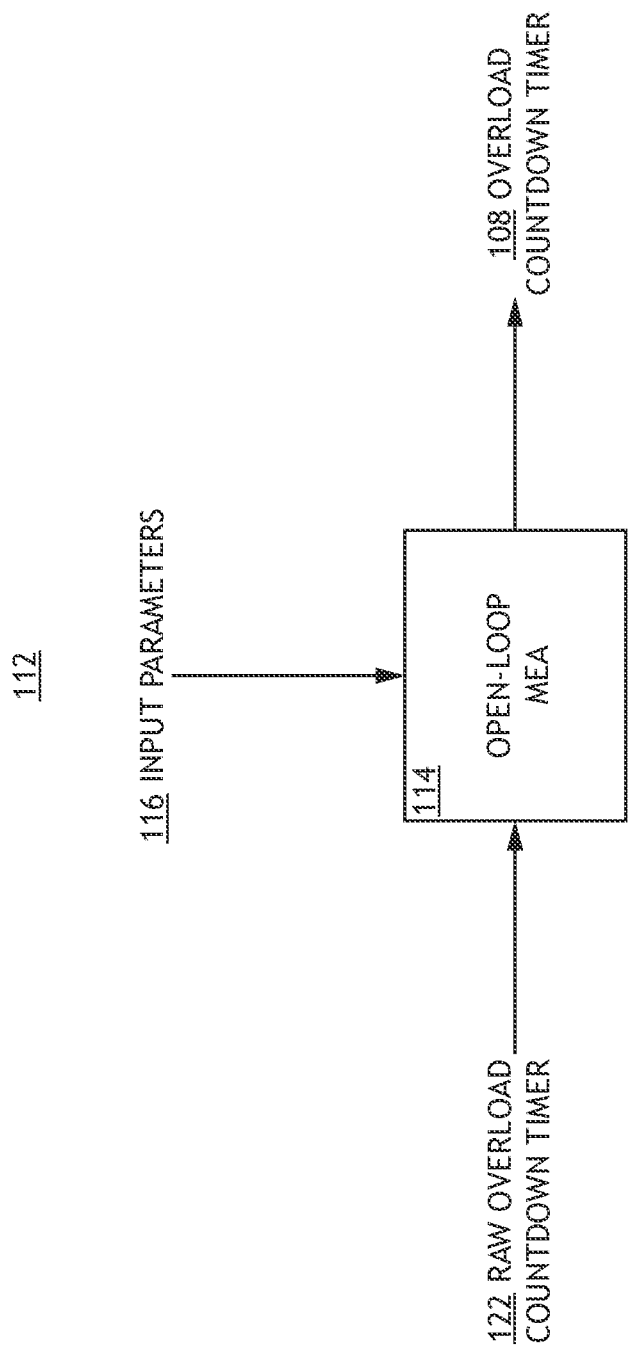
FIG. 2 is a conceptual block diagram of the adaptive minimum envelope filter in accordance with one or more embodiments of the present disclosure.

FIG. 2 is a conceptual block diagram of the adaptive minimum envelope filter 112 in accordance with one or more embodiments of the present disclosure.

In some embodiments, the open-loop MEA 114 accepts a raw overload countdown timer 122 and provides the overload countdown timer 108. As described previously herein, the open-loop MEA 114 may further accept one or more input parameters 116 that may tailor or otherwise control the performance of the open-loop MEA 114. In some embodiments, the raw overload countdown timer 122 corresponds to an overload countdown timer 108 for the UPS 102 associated with an estimated time remaining in an overload condition, which may be generated using any technique known in the art.

In some embodiments, the open-loop MEA 114 is defined according to equations (1)-(5) below.

Let $\mathbb{Z}^{16U}$ be the set of unsigned 16-bit integers, formally:

$$\{\mathbb{Z}^{16U}: \mathbb{Z}^{16U}, 0 \leq \mathbb{Z}^{16U} \leq \mathbb{Z}_{max}^{16U}, \mathbb{Z}_{max}^{16U} = 2^{16} - 1\} \quad (1)$$

The open-loop MEA 114 accepts a discrete time signal (e.g., the raw overload countdown timer 122) as an input $\{x[n]: x[n] \in \mathbb{Z}^{16U}\}$ and provides an output signal y[n] (e.g., the overload countdown timer 108).

$$y[n] = g[n] * \text{squarewave}\left(n - \phi, \frac{1}{T}, T\right), \quad (2)$$

$$\{\phi: \phi \in \mathbb{Z}^{16U}, \phi \leq T\}, \quad (3)$$

$$\text{squarewave}(n, d, T) = \frac{((n-d*T) \bmod T) - (n \bmod T) + d*T}{T}, \text{ and} \quad (4)$$

$$g[n] = \min(x[n], g[n-1]) * \text{squarewave}\left(n, 1 - \frac{1}{T}, T\right) + \mathbb{Z}_{max}^{16U} * \text{squarewave}\left(n, \frac{1}{T}, T\right) \quad (5)$$

where n is the discrete time, T is the period of the squarewave function and corresponds to a count reset threshold, d is the duty cycle of the squarewave function, and corresponds to a minimum count reset threshold (e.g., a minimum value of T).

Figure 3:
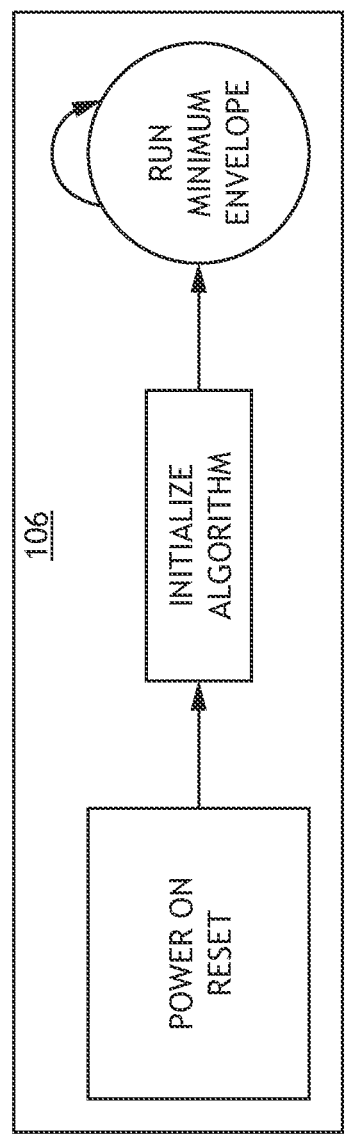
FIG. 3 is a flow diagram of actions performed by the controller that would initialize the minimum envelope algorithm and run it, in accordance to one or more embodiments of the present disclosure.

FIG. 3 is a flow diagram of actions performed by the controller 106 that would initialize the minimum envelope algorithm and run it, in accordance to one or more embodiments of the present disclosure. For example, upon a system power-on and initialization, the adaptive minimum envelope filter 112 may be iteratively operated.

In equations (1)-(5) above, parameters such as or T may be provided as input parameters 116. In this way, the values of these parameters may be set during run-time in an open-loop configuration or may be dynamically adjusted in a closed-loop configuration to tailor or adjust the performance of the open-loop MEA 114. For example, the value of T may be associated with a resolution of the open-loop MEA 114 (e.g., as associated with a discrete input signal x[n]).

As specified in equation (2), the value of T may be equal to or greater than $\phi$. In some embodiments, this is satisfied by setting T=α·$\phi$, where a is a constant greater than or equal to 1. In this way, $\phi$ and/or α may be input parameters 116 (e.g., that may be set by a user in an open-loop configuration or dynamically adjusted in a closed-loop configuration). It is contemplated herein that a value of T=$\phi$(e.g., a=1) may be a good starting point or nominal value for many signals. In the case that there is too much noise in the raw overload countdown timer 122 such that the overload countdown timer 108 is negatively impacted, possible solutions may be to increase the value of T, use a low-pass filter, or downsample the overload countdown timer 108. In a general sense, the value of a may be any constant greater than or equal to 1. For example, a value of α=1 corresponds to a 50$^{th}$ percentile (e.g., providing an average number of samples to see all values in the range), a value of α=3 corresponds to a 99$^{th}$ percentile for seeing all values in the range, a value of α=4 corresponds to a 99.99$^{th}$ percentile for seeing all values in the range, and so on with a logarithmic trend.

By way of another example, the value of (e.g., the minimum count reset threshold) may also be used to tailor the responsivity of the open-loop MEA 114 to noise or fluctuations in the raw overload countdown timer 122. For example, let x[n]=s[n]+R($r_{min}$, $r_{max}$) where s[n] is the true raw overload countdown timer 122 and R($r_{min}$, $r_{max}$) is a uniformly distributed random variable on the interval [$r_{min}$, $r_{max}$]. The probability of drawing a specific integer in the interval on any sample n is [(r_max, r_min)]. For a random process such as x[n], the expected value for the number of samples it takes to observe the entire range of equiprobable integers is given by equation (6):

$$\phi = \sum_{k=1}^{n} \frac{n}{k}, n = \text{r\_max} - \text{r\_min} + 1. \quad (6)$$

As an example, if max(x[n])=139, and min(x[n])=135, then n=5. For n=5, equation (6) implies that $\phi$=11.41.

Figure 4:
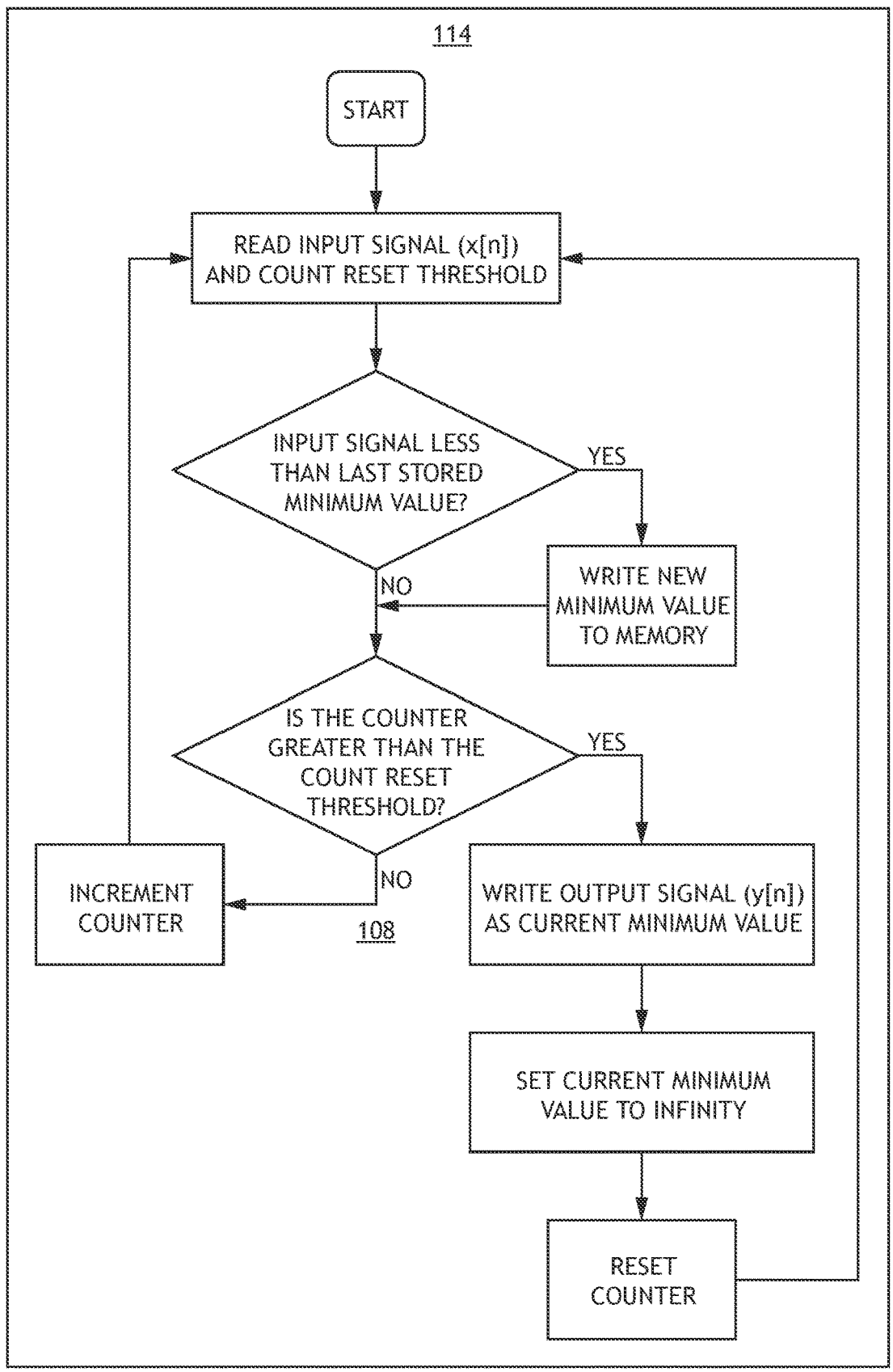
FIG. 4 is a block-level flow diagram of the open-loop minimum envelope algorithm (MEA) in accordance with one or more embodiments of the present disclosure.

FIG. 4 is a block-level flow diagram of the open-loop MEA 114 in accordance with one or more embodiments of the present disclosure.

In particular, the block-level flow diagram of FIG. 4 illustrates an operational implementation of the open-loop MEA 114. Further, FIG. 4 is consistent with, but not limited to, equations (1)-(5) above. For example, the raw overload countdown timer 122 may be provided as the input signal (x[n]) and a value of the count reset threshold (T) may be received as an input parameter 116. As described with respect to equations (1)-(5), the value of the count reset threshold (T) may be set to a minimum value of $\phi$ or a greater value if necessary (e.g., to mitigate the impact of noise in the raw overload countdown timer 122). If the value of the raw overload countdown timer 122 is less than a last-stored value (e.g., a last-stored minimum value), the current value is stored in memory as the minimum value. If the value of the raw overload countdown timer 122 is not less than the last-stored minimum value, the last-stored minimum value is retained as the minimum value. A counter is then incremented. This process repeats until the value of the counter is greater than the count reset threshold (T), at which point the current minimum value is provided as the overload countdown timer 108 (y[n]), the counter is reset, and the current minimum value is reset (e.g., set to infinity, or any suitable value). The open-loop MEA 114 may then be iteratively performed as illustrated in FIG. 3. In this way, the count reset threshold (T) may correspond to a maximum number of discrete data values for which the overload countdown timer 108 (y[n]) may be set to a last-stored minimum value before a new minimum value is set (e.g., stored).

Figure 5:
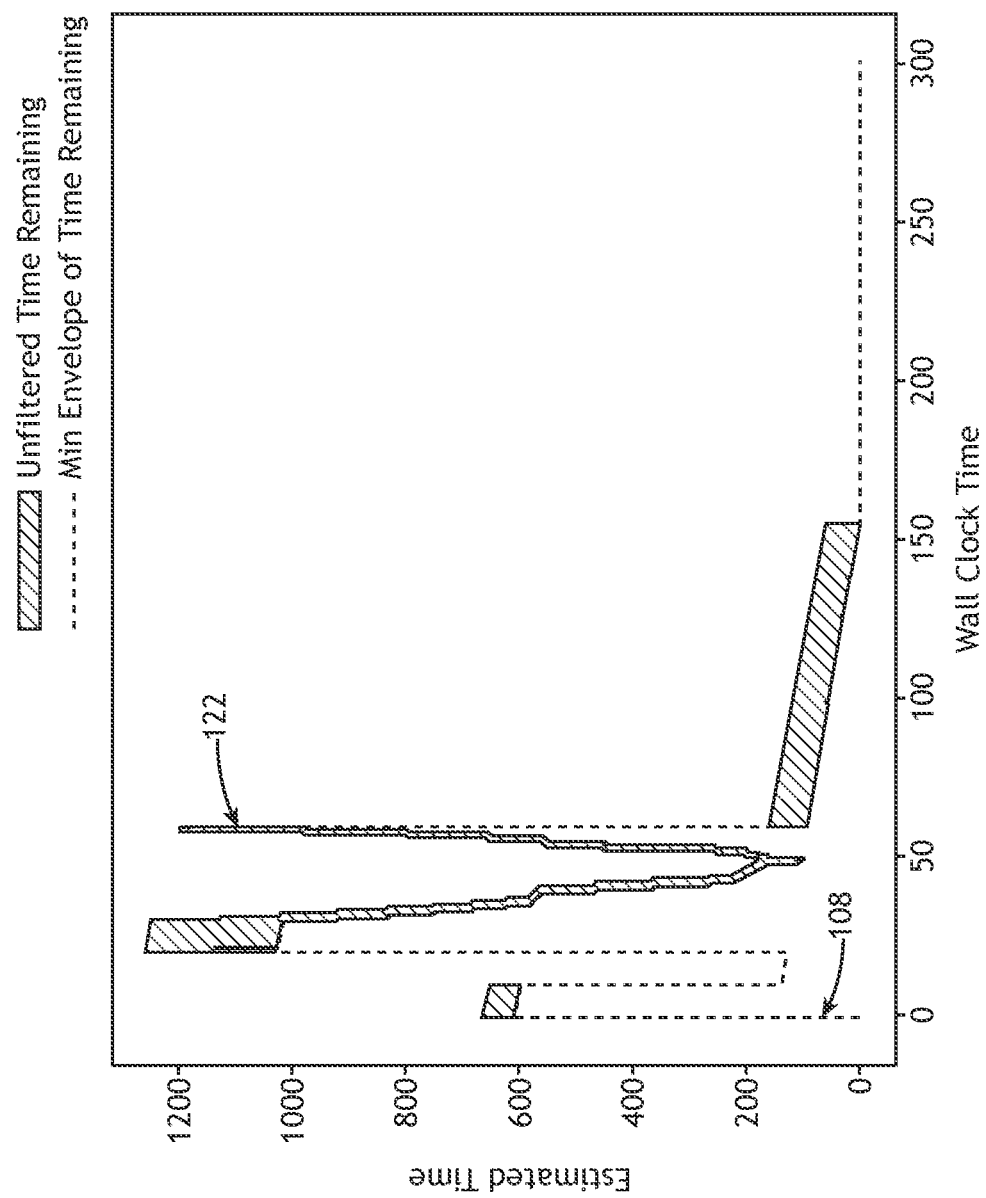
FIG. 5 is a plot of an input raw overload countdown timer and an output overload countdown timer generated with an adaptive minimum envelope filter in an open-loop configuration versus time, in accordance with one or more embodiments of the present disclosure.
Figure 6:
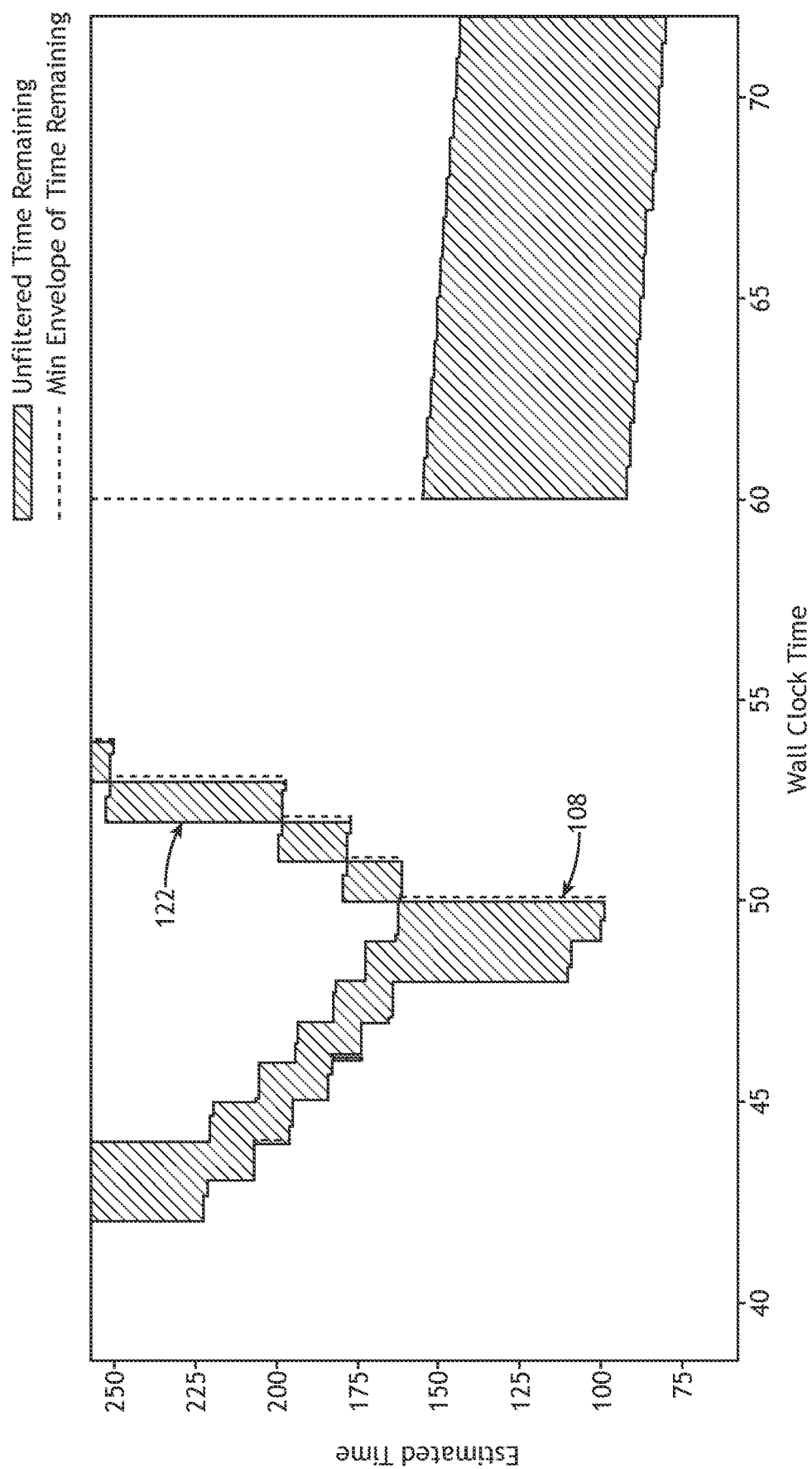
FIG. 6 is a detailed view of FIG. 5, further illustrating the operation of the UPS system, in accordance with one or more embodiments of the present disclosure.

Referring now to FIGS. 5 and 6, the generation of a smooth overload countdown timer 108 using the UPS system 100 in an open-loop configuration is illustrated in accordance with one or more embodiments of the present disclosure.

FIG. 5 is a plot of an input raw overload countdown timer 122 and an output overload countdown timer 108 generated with an adaptive minimum envelope filter 112 in an open-loop configuration versus time (e.g., Wall Clock Time), in accordance with one or more embodiments of the present disclosure.

FIG. 6 is a detailed view of FIG. 5, further illustrating the operation of the UPS system 100, in accordance with one or more embodiments of the present disclosure.

Referring now to FIGS. 7-16 and Tables 1 and 2, closed-loop operation of the adaptive minimum envelope filter 112 is described in greater detail in accordance with one or more embodiments of the present disclosure.

In some embodiments, the value of the count reset threshold (T) may be set to T=α·$\phi$ for closed-loop operation as described previously herein.

A suitable value for may be found using any suitable technique. In some embodiments, a value for is found by analyzing the input raw overload countdown timer 122, particularly a noise or variability of the raw overload countdown timer 122. For example, a value for ϕ may be determined by finding $$f = \frac{dx}{dn}$$

and measuring an average maximum level of f, or more formally $$\phi = \mathbb{E}\left[\max \frac{dx}{dn}\right].$$

In this way, the adaptive minimum envelope filter 112 may be operated in a closed-loop configuration through forward control of one or more input parameters 116 such as, but not limited to, ϕ based on the raw overload countdown timer 122 (e.g., using the signal-monitoring circuitry 118).

Figure 7A:
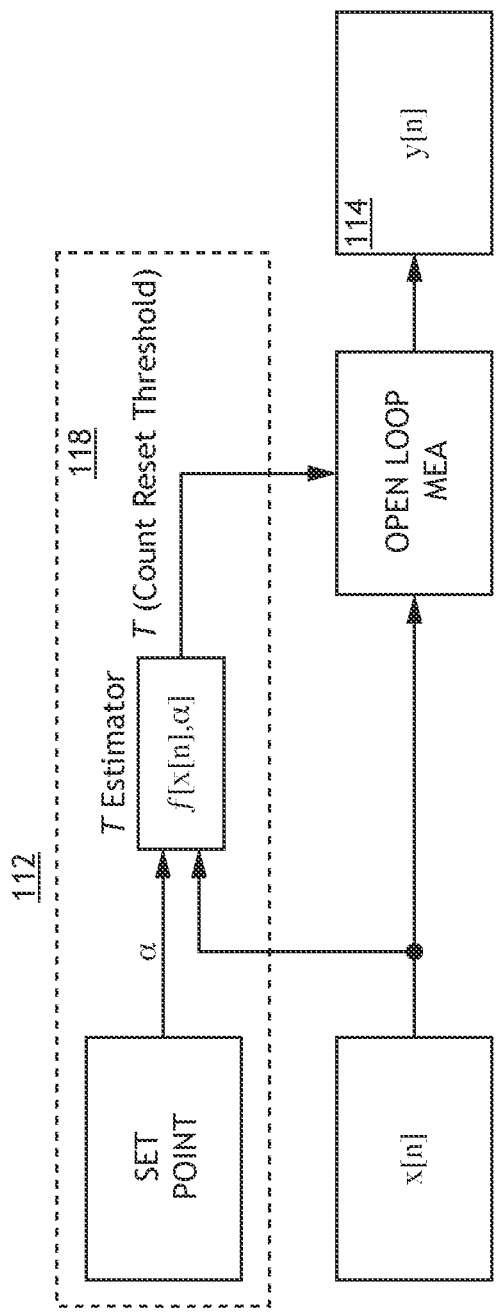
FIGS. 7A-7C include block-level flow diagrams of the adaptive minimum envelope filter configured for closed-loop operation, in accordance with one or more embodiments of the present disclosure.
Figure 7B:
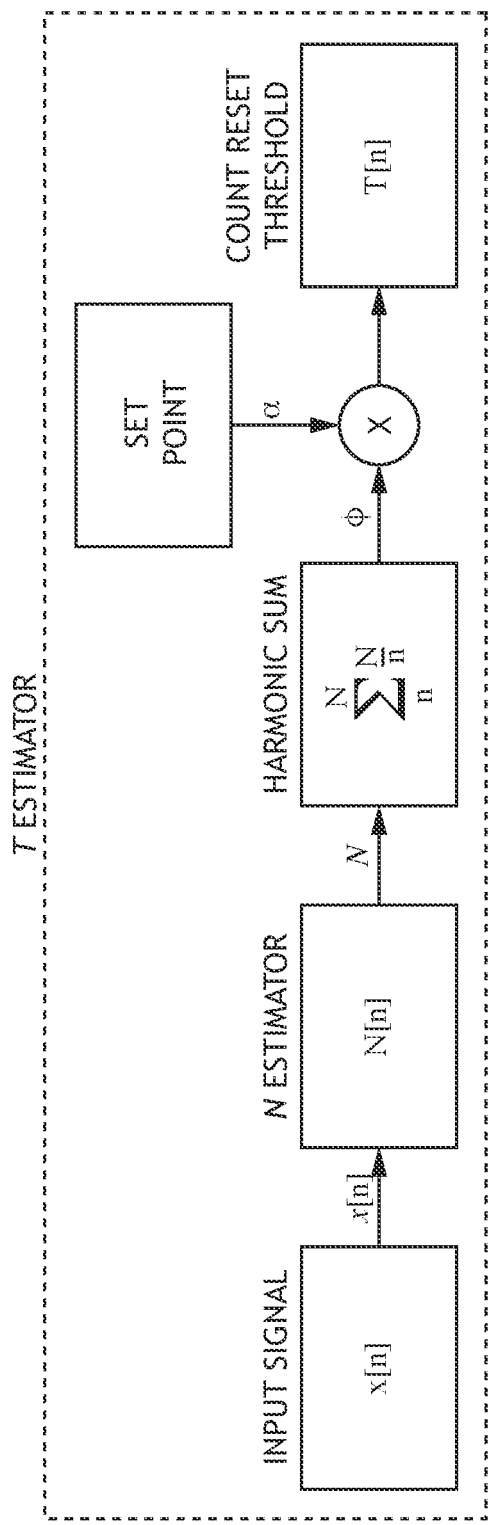
Figure 7C:
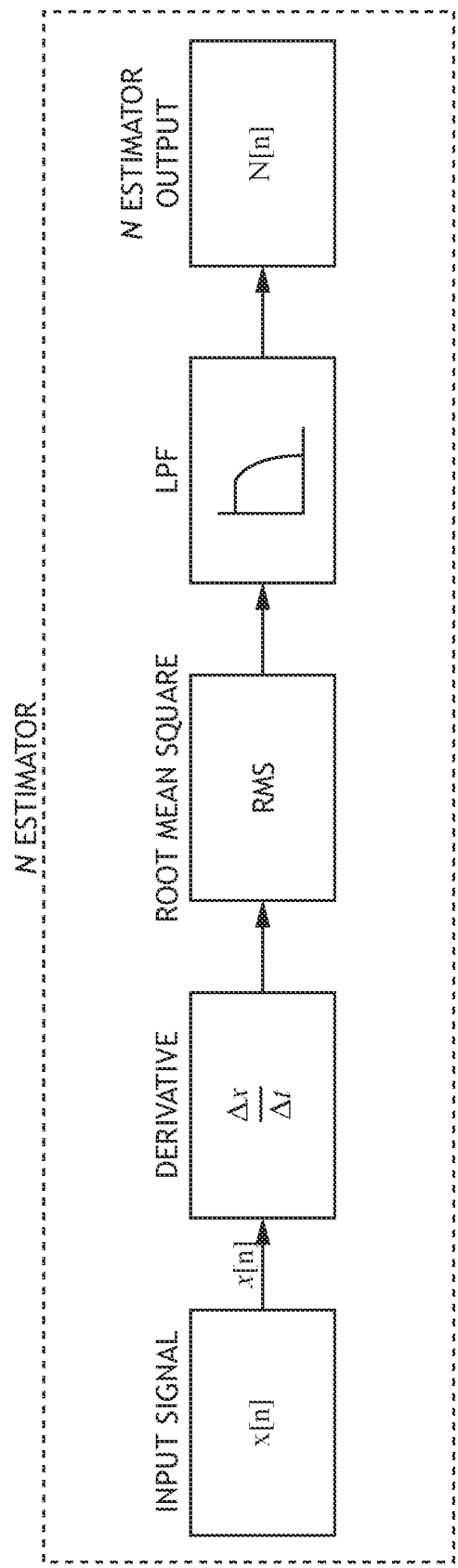

FIGS. 7A-7C include block-level flow diagrams of the adaptive minimum envelope filter 112 configured for closed-loop operation, in accordance with one or more embodiments of the present disclosure. In particular, FIG. 7A provides a high-level flow diagram including the use of the signal-monitoring circuitry 118 to control the value of the count reset threshold (T) using a T estimator shown in greater detail in FIG. 7B. FIG. 7C illustrates an N estimator from FIG. 7B in greater detail.

For example, the signal-monitoring circuitry 118 may receive the raw overload countdown timer 122 (x[n]) and apply various operations such as, but not limited to, a derivative, a root-mean-square operation, a low-pass filter, and a harmonic sum operation to provide forward control of the minimum count reset threshold of the open-loop MEA 114 (e.g., ϕ). Further, the set point illustrated in FIGS. 7A and 7B corresponds to the value of a described previously herein.

Further, although not shown, it is contemplated herein that various other input parameters 116 may similarly be controlled using feed-forward and/or feedback control loops.

Referring now to FIGS. 8-16, simulated comparisons of closed-loop operation and open-loop operation with manually-selected input parameters 116 are described in greater detail in accordance with one or more embodiments of the present disclosure.

Figure 8:
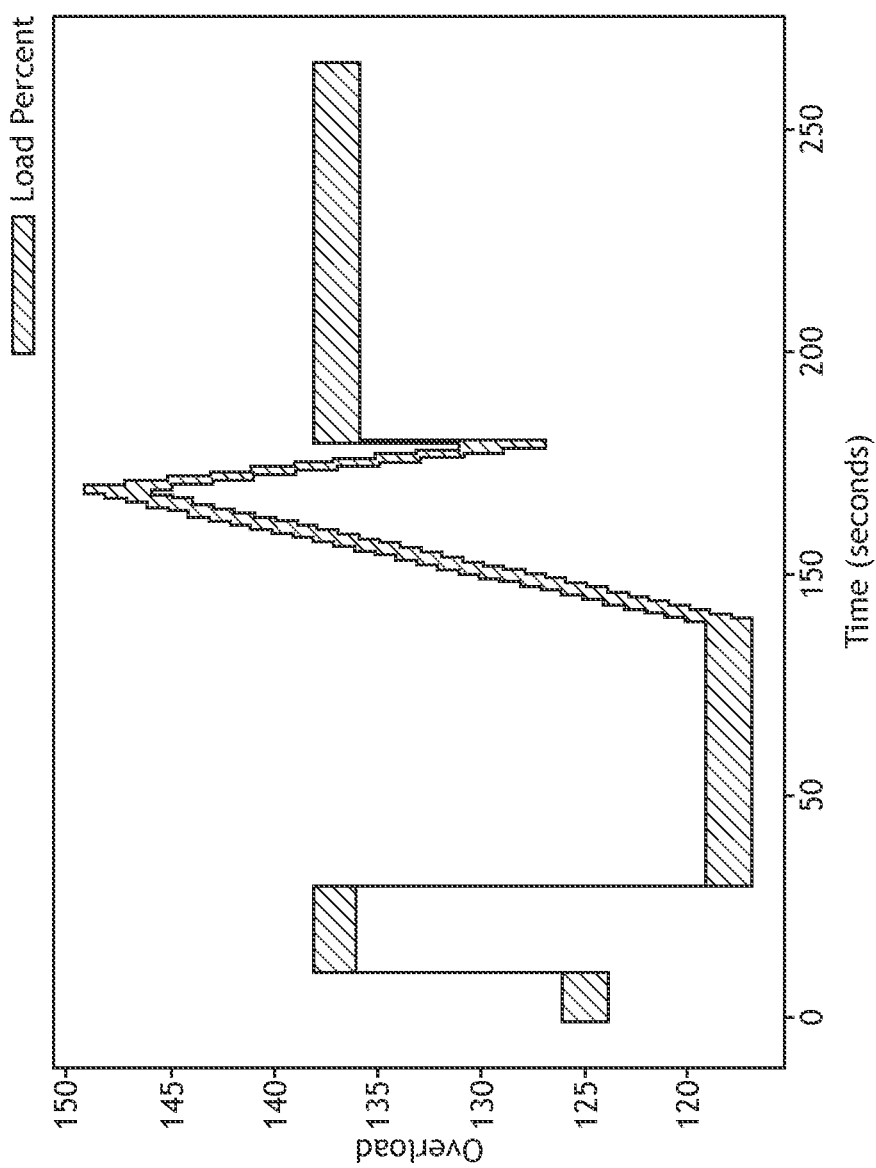
FIG. 8 is a plot of the input load percentage from the load measurement circuitry in accordance with one or more embodiments of the present disclosure.

FIG. 8 is a plot of the input load percentage from the load measurement circuitry 104 in accordance with one or more embodiments of the present disclosure.

Figure 9:
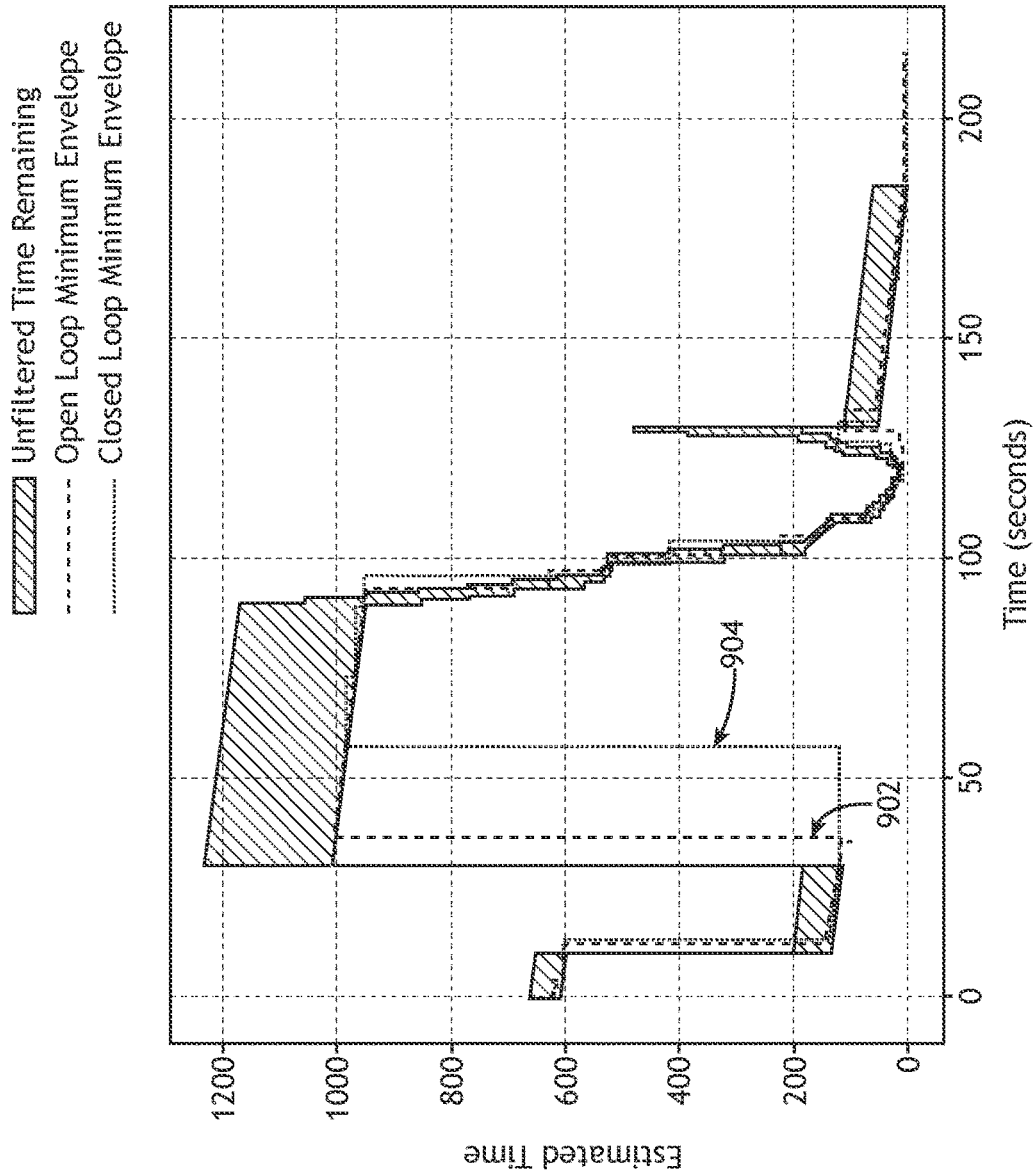
FIG. 9 is a plot of the overload countdown timer generated in an open-loop configuration and a closed-loop configuration based on a common input raw overload countdown timer, in accordance with one or more embodiments of the present disclosure.

FIG. 9 is a plot of the overload countdown timer 108 generated in an open-loop configuration 902 and a closed-loop configuration 904 based on a common input raw overload countdown timer 122, in accordance with one or more embodiments of the present disclosure.

Figure 10:
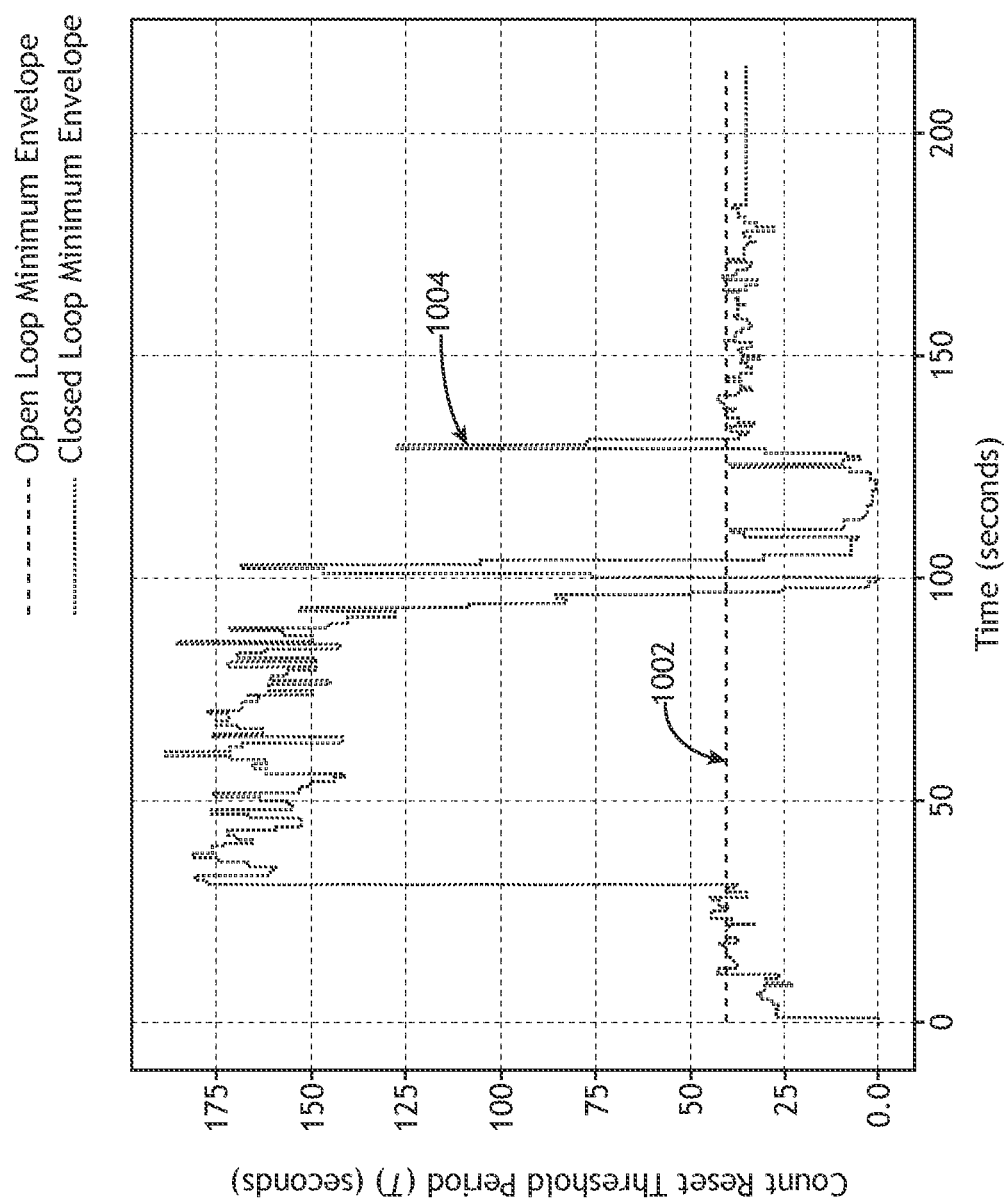
FIG. 10 is a plot of the count reset threshold versus time for the open-loop configuration and the closed-loop configuration, in accordance with one or more embodiments of the present disclosure.

FIG. 10 is a plot of the count reset threshold (T) versus time for the open-loop configuration 1002 and the closed-loop configuration 1004, in accordance with one or more embodiments of the present disclosure. The closed loop configuration 1004 dynamically sets the count reset threshold whereas the open loop configuration 1002 count reset threshold is static.

Figure 11:
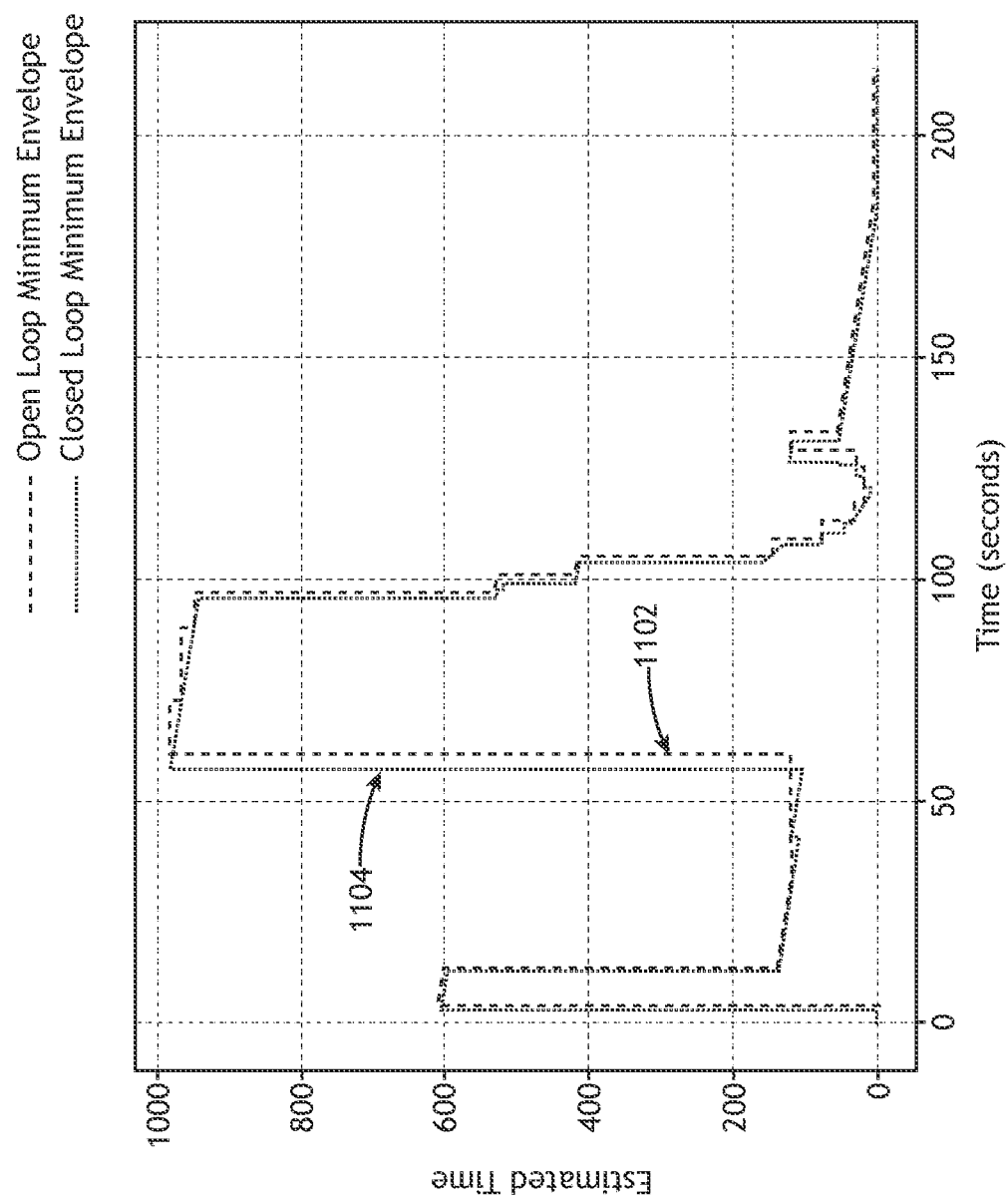
FIG. 11 is a plot of the overload countdown timer for the open-loop configuration and the closed-loop configuration, in accordance with one or more embodiments of the present disclosure.

FIG. 11 is a plot of the overload countdown timer 108 (e.g., as displayed on the display device 110) for the open-loop configuration 1102 and the closed-loop configuration 1104, in accordance with one or more embodiments of the present disclosure. For example, FIG. 11 may illustrate data that may be displayed on the display device 110 for these configurations. As shown in FIG. 11, the closed loop configuration produces a smoother countdown on the display device 110 than the open loop configuration.

Figure 12:
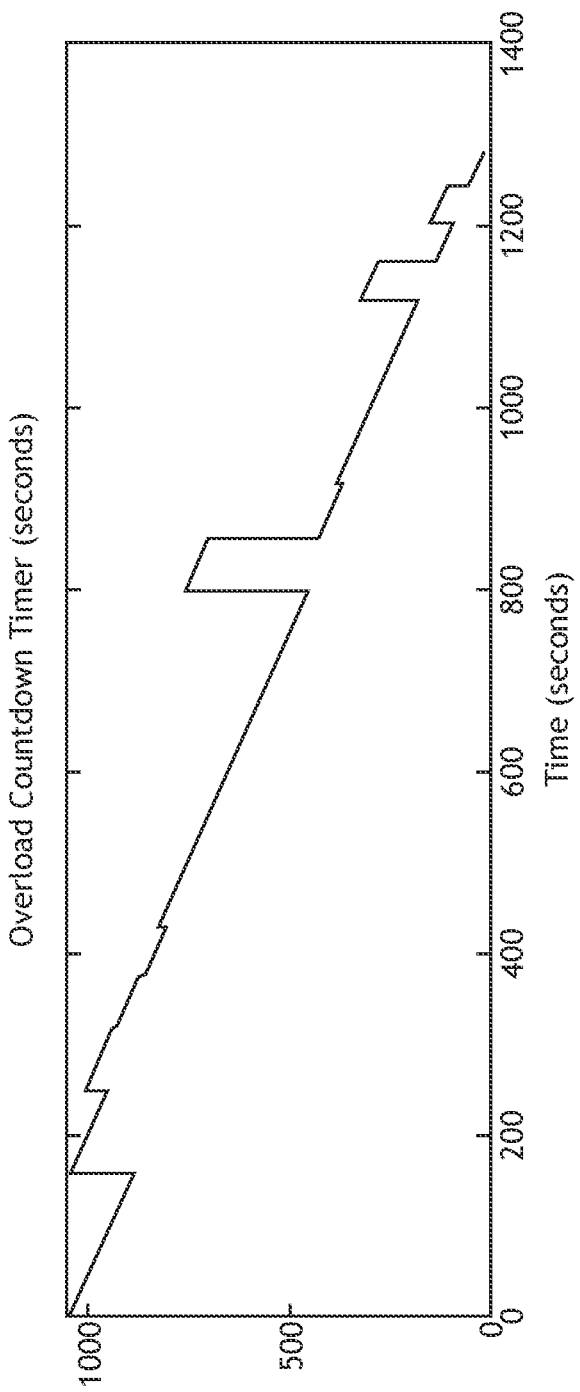
FIG. 12 is a plot of an overload countdown timer generated using an open-loop configuration of the adaptive minimum envelope filter, in accordance with one or more embodiments of the present disclosure.

FIG. 12 is a plot of an overload countdown timer 108 generated using an open-loop configuration of the adaptive minimum envelope filter 112, in accordance with one or more embodiments of the present disclosure. For this demonstration, the UPS 102 was loaded to provide a load percentage of 115% and the input parameters 116 including were manually set to achieve performance within selected tolerances.

Figure 13:
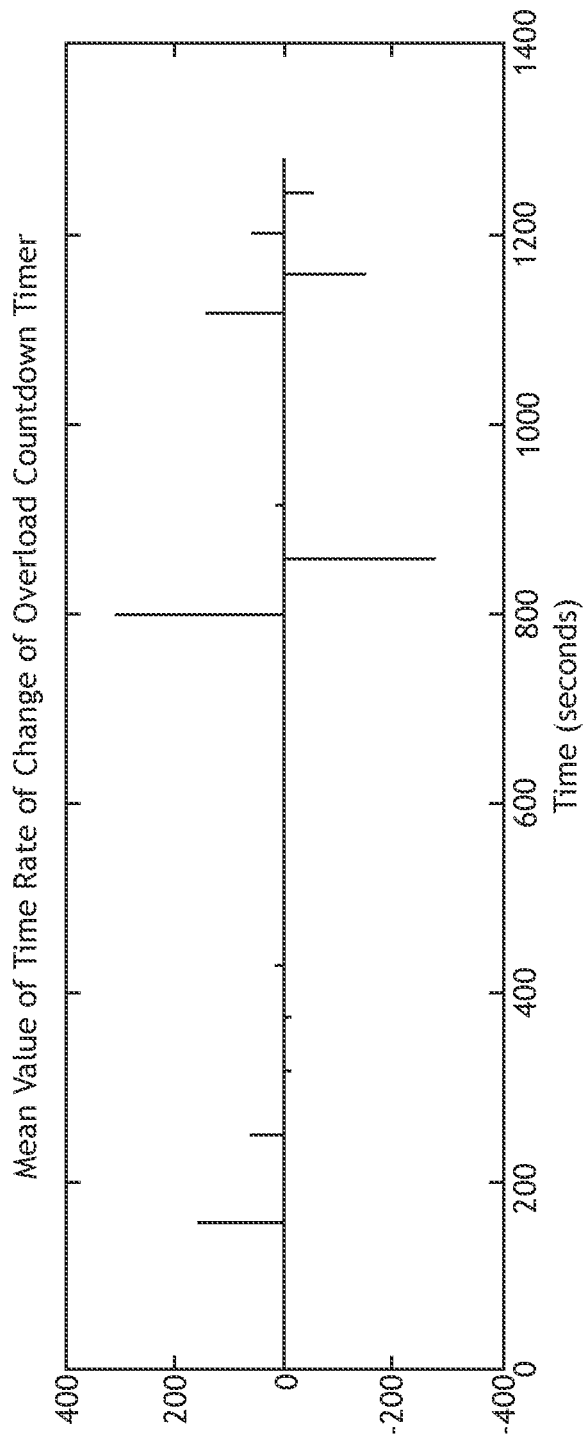
FIG. 13 is a plot illustrating a mean value of the time rate of change of the time remaining provided by the overload countdown timer, in accordance with one or more embodiments of the present disclosure.

FIG. 13 is a plot illustrating a mean value of the time rate of change of the time remaining provided by the overload countdown timer 108, in accordance with one or more embodiments of the present disclosure. The mean value of the data in FIG. 12 was −0.9308 with a standard deviation of 24.73 seconds.

Table 1 is a table providing run-time statistics in the open-loop configuration illustrated in FIGS. 11 and 12, in accordance with one or more embodiments of the present disclosure.

TABLE 1

| Measure | Value | Unit |
| --- | --- | --- |
| Number of Samples | 513 | — |
| Average Time | 0.175 | Microseconds |
| Standard Deviation | 0.380 | Microseconds |
| 95% Confidence Interval | 0.033 | Microseconds |
| 95% Confidence Interval Low | 0.142 | Microseconds |
| 95% Confidence Interval High | 0.208 | Microseconds |

As illustrated in Table 1, the average run-time of the adaptive minimum envelope filter 112 in the open-loop configuration was about 0.175 microseconds.

Figure 14:
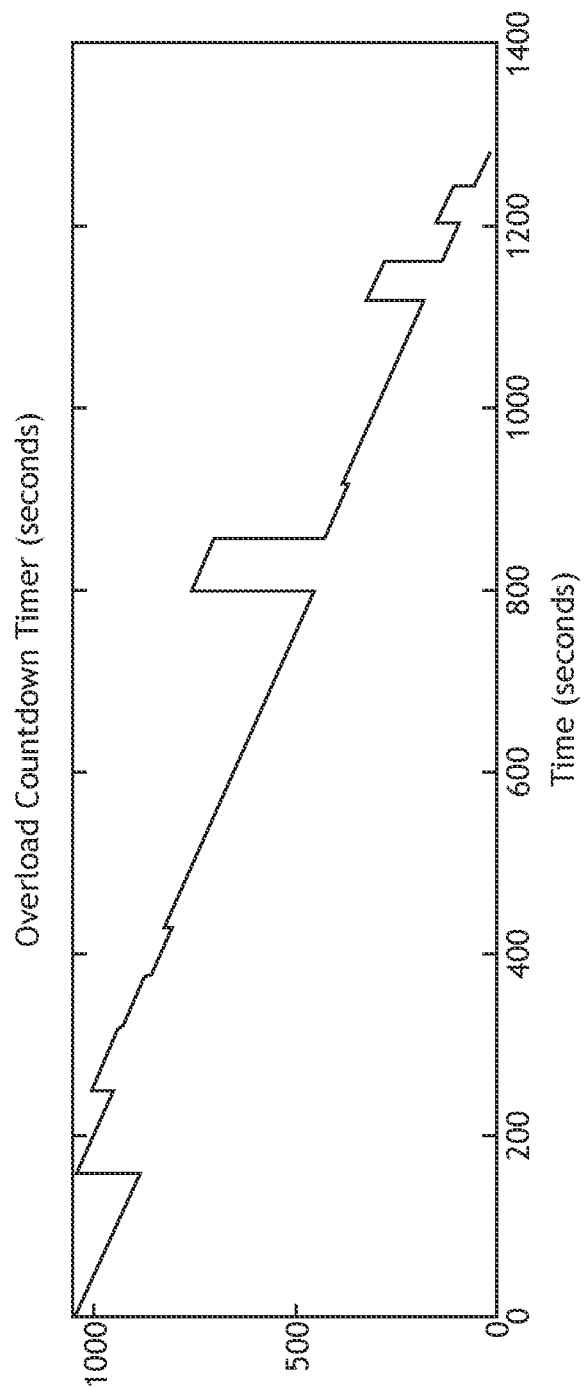
FIG. 14 is a plot of an overload countdown timer generated using a closed-loop configuration of the adaptive minimum envelope filter, in accordance with one or more embodiments of the present disclosure.

FIG. 14 is a plot of an overload countdown timer 108 generated using a closed-loop configuration of the adaptive minimum envelope filter 112 (e.g., as illustrated in FIG. 10) in accordance with one or more embodiments of the present disclosure. The load percentage of 115% was unchanged with respect to the open-loop demonstration.

Figure 15:
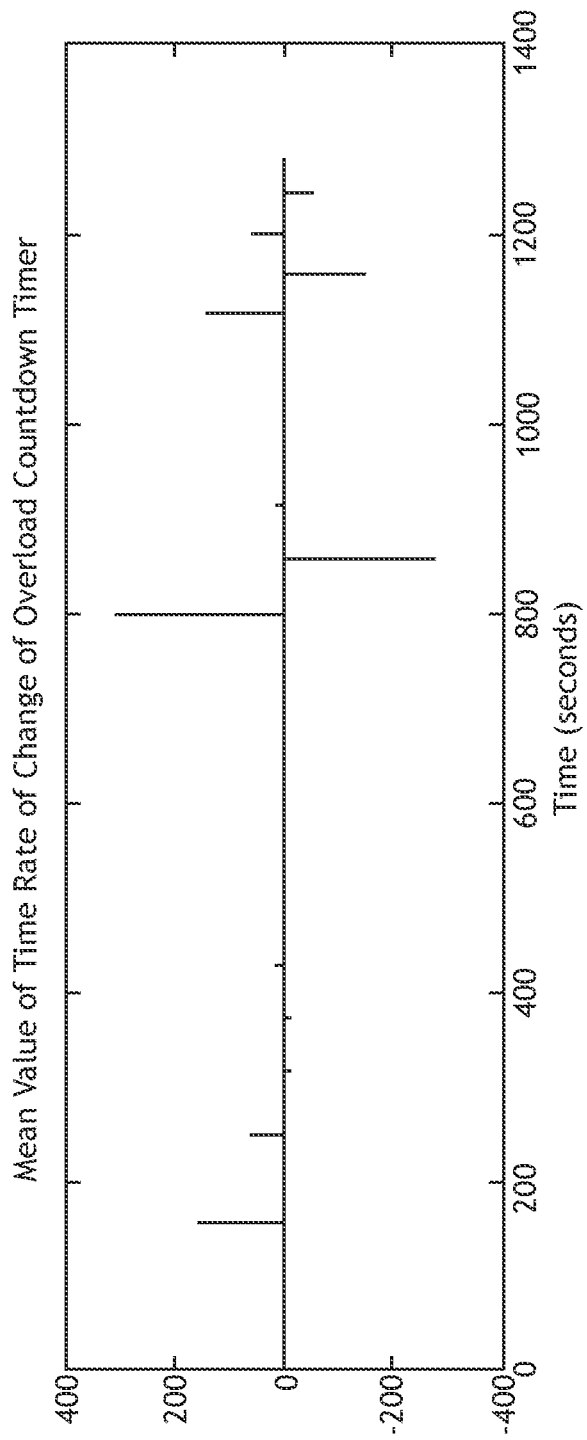
FIG. 15 is a plot illustrating a mean value of the time rate of change of the time remaining provided by the overload countdown timer, in accordance with one or more embodiments of the present disclosure.

FIG. 15 is a plot illustrating a mean value of the time rate of change of the time remaining provided by the overload countdown timer 108, in accordance with one or more embodiments of the present disclosure.

Table 2 is a table providing run-time statistics in the closed-loop configuration illustrated in FIGS. 14 and 15, in accordance with one or more embodiments of the present disclosure.

TABLE 2

| Measure | Value | Unit |
| --- | --- | --- |
| Number of Samples | 248 | — |
| Average Time | 24.762 | Microseconds |
| Standard Deviation | 25.435 | Microseconds |
| 95% Confidence Interval | 3.166 | Microseconds |
| 95% Confidence Interval Low | 21.596 | Microseconds |
| 95% Confidence Interval High | 27.928 | Microseconds |

Figure 16:
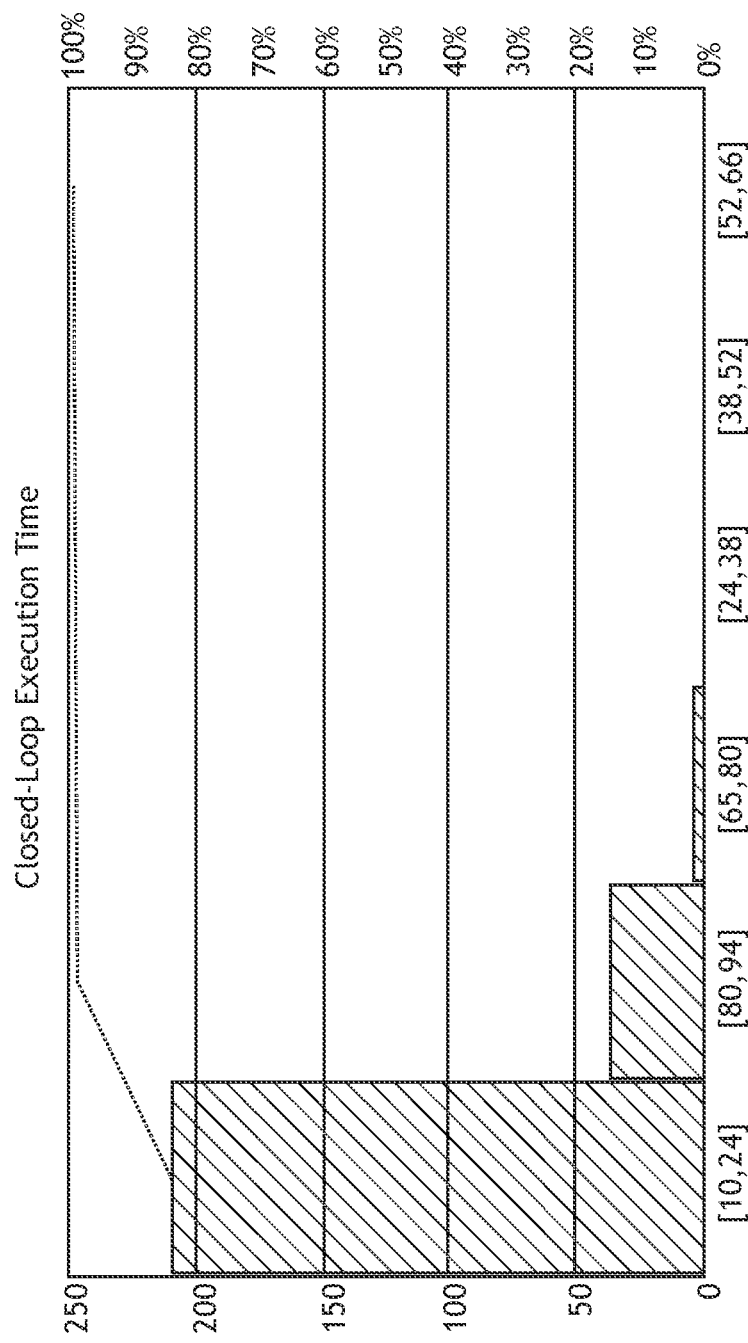
FIG. 16 is a plot illustrating a pareto chart of the closed-loop execution time in accordance with one or more embodiments of the present disclosure.

FIG. 16 is a plot illustrating a pareto chart of the closed-loop execution time in accordance with one or more embodiments of the present disclosure.

As illustrated by FIGS. 14-16 and Table 2, the closed-loop configuration rapidly converged to stable values of the input parameters 116 with an average execution time of 24.762 microseconds, which indicates stable operation. Further, a Cohen's D test was performed on the mean and standard deviation of the data in FIGS. 12 and 14, with a result of approximately 0.006 indicating that there is no meaningful difference in this data between the open-loop and closed-loop configurations. Accordingly, the closed-loop configuration may promote automation and reduce the need for signal analysis by an operator.

Figure 17:
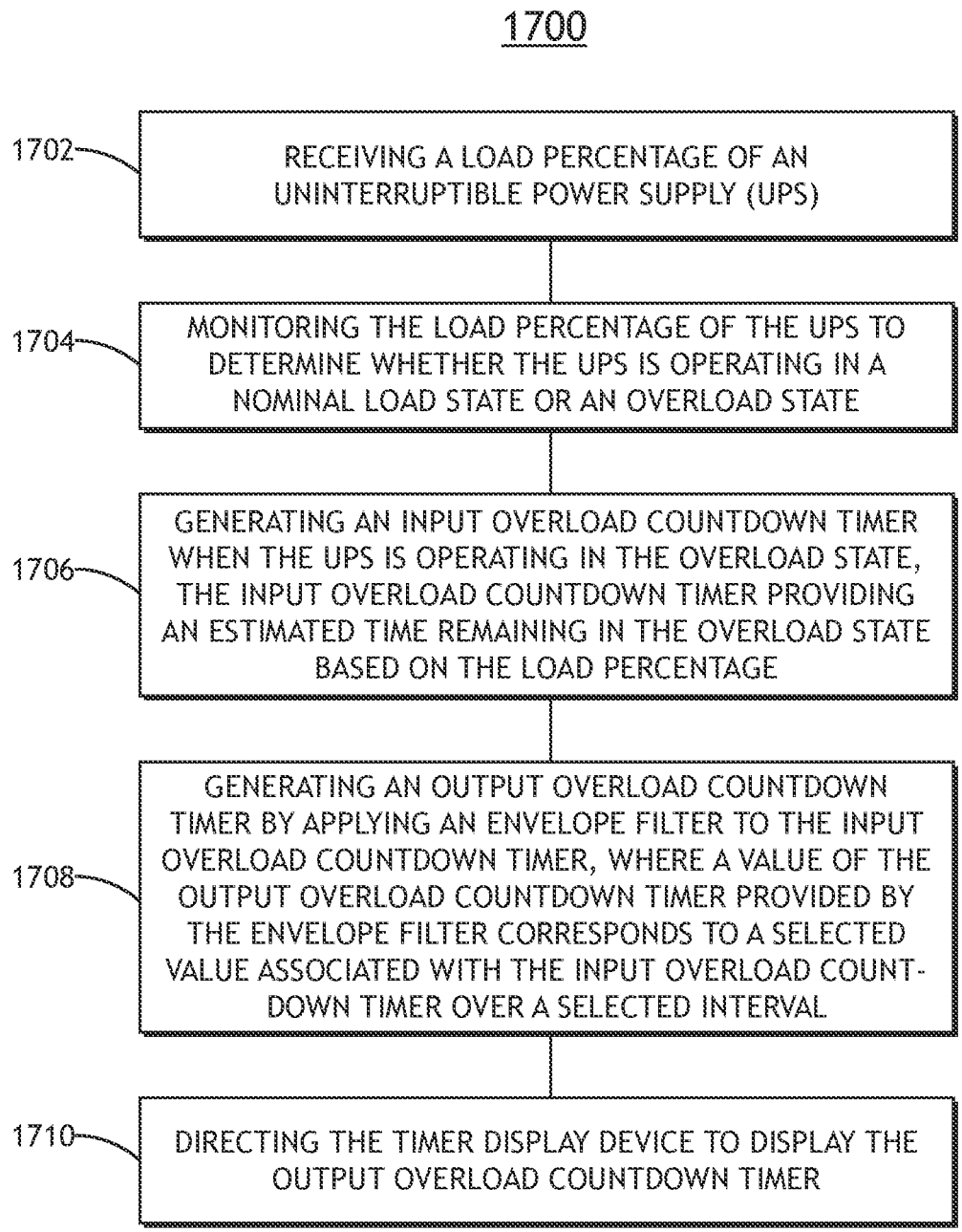
FIG. 17 is a flow diagram illustrating steps performed in a method for countdown timer generation, in accordance with one or more embodiments of the present disclosure.

Referring now to FIG. 17, FIG. 17 is a flow diagram illustrating steps performed in a method 1700 for countdown timer generation, in accordance with one or more embodiments of the present disclosure. Applicant notes that the embodiments and enabling technologies described previously herein in the context of the UPS system 100 should be interpreted to extend to method 1700. It is further noted, however, that the method 1700 is not limited to the architecture of UPS system 100.

In some embodiments, the method 1700 includes a step 1702 of receiving a load percentage of a UPS 102. In some embodiments, the method 1700 includes a step 1704 of monitoring the load percentage of the UPS 102 to determine whether the UPS 102 is operating in a nominal load state or an overload state. In some embodiments, the method 1700 includes a step 1706 of generating an input overload countdown timer when the UPS 102 is operating in the overload state, the input overload countdown timer providing an estimated time remaining in the overload state based on the load percentage. In some embodiments, the method 1700 includes a step 1708 of generating an output overload countdown timer by applying an envelope filter to the input overload countdown timer, where a value of the output overload countdown timer provided by the envelope filter corresponds to a selected value associated with the input overload countdown timer over a selected interval. In some embodiments, the method 1700 includes a step 1710 of directing a display device 110 to display the output overload countdown timer. In some embodiments, though not shown, the method 1700 includes a step of controlling one or more additional components based on the output overload countdown timer.

Referring now generally to FIGS. 1-17, although the adaptive minimum envelope filter 112 disclosed herein is described in the context of generating an overload countdown timer 108 for a UPS 102 from an input raw overload countdown timer 122, it is contemplated herein that the adaptive minimum envelope filter 112 is not limited to this application. In a general sense, the adaptive minimum envelope filter 112 may be used to find the minimum of any signal with additive noise over a discrete time interval. The adaptive minimum envelope filter 112 may be particularly efficient for, but is not limited to, signals having a relatively small standard deviation with an order of approximately 0 (94 $\log(\sigma)$), where $\sigma$ is the standard deviation. Further, the closed-loop configuration of the adaptive minimum envelope filter 112 may further be particularly suitable for, but is not limited to, signals with uniformly distributed noise (e.g., as opposed to random or gaussian noise distributions) and for integer-valued signals (e.g., as opposed to floating point numbers).

It is further contemplated herein that the systems and methods disclosed herein are not limited to countdown timers for overload applications. Rather, the systems and methods disclosed herein may be applied to any discrete input signal ($x[n]$). In this way, references to an overload countdown timer 108 may be replaced or understood as references to a countdown timer more generally. Further, references to load measurement circuitry 104 may be replaced with or understood as references to measurement circuitry more generally, where the measurement circuitry provides a status indication of a process to be monitored.

In some embodiments, the adaptive minimum envelope filter 112 is used to generate a smooth output countdown signal indicative of a battery capacity or time remaining on battery power of a UPS 102. In this way, references to load measurement circuitry 104 may be replaced with or understood as references to battery capacity measurement circuitry.

In some embodiments, the adaptive minimum envelope filter 112 is used to generate smooth output signals for additional systems besides a UPS 102 from a noisy input signal.

It is further contemplated herein that the adaptive minimum envelope filter 112 may be readily adapted or generalized to an adaptive maximum envelope filter instead of a minimum envelope filter based on the concepts disclosed herein (e.g., by replacing references to minimum values in FIG. 4 to refer to maximum values). Further, an adaptive median filter may be provided by combining an adaptive minimum envelope filter 112 (minEnvFilter) with an adaptive maximum envelope filter (maxEnvFilter) through the following: medianFilter=(maxEnvFilter+minEnvFilter)/2. Additional generalized filter variations based on the concepts disclosed herein may similarly be developed and are within the spirit and scope of the present disclosure.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a specific functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system comprising:
an uninterruptible power supply (UPS);
load measurement circuitry configured to determine a load percentage of the UPS; and
a controller configured to:
receive the load percentage of the UPS from the load measurement circuitry;
monitor the load percentage of the UPS to determine whether the UPS is operating in a nominal load state or an overload state based on the load percentage;
generate an input overload countdown timer when the UPS is operating in the overload state, the input overload countdown timer providing an estimated time remaining in the overload state based on the load percentage; and
generate an output overload countdown timer by applying an envelope filter to the input overload countdown timer by, for each selected interval in a series of intervals:
receive a count reset threshold for the selected interval; and
when a counter is less than or equal to the count reset threshold, output a selected value of the input overload countdown timer within the selected interval as a value of the output overload countdown timer, wherein the selected value is a minimum value or a maximum value of the input overload countdown timer within the selected interval; and
when the counter is greater than the count reset threshold, output the selected value of the input overload countdown timer and reset the counter for a subsequent interval of the series of intervals; and
at least one of direct a display device to display the output overload countdown timer or control one or more additional components based on the output overload countdown timer.

2. The system of claim 1, wherein the envelope filter is a minimum envelope filter, wherein the selected value associated with the input overload countdown timer is the minimum value of the input overload countdown timer within the selected interval.

3. The system of claim 1, wherein the envelope filter is a maximum envelope filter, wherein the selected value associated with the input overload countdown timer is the maximum value of the input overload countdown timer within the selected interval.

4. The system of claim 1, wherein the envelope filter is a median envelope filter, wherein the selected value associated with the input overload countdown timer is an average of the maximum value and the minimum value of the input overload countdown timer within the selected interval.

5. The system of claim 1, wherein the count reset threshold is set prior to run-time.

6. The system of claim 1, wherein the controller further controls values of the count reset threshold during run-time.

7. The system of claim 6, wherein the controller controls the values of the count reset threshold during run-time based on a noise measurement of the input overload countdown timer.

8. The system of claim 1, further comprising:
a user input device configured to receive a value of the count reset threshold.

9. A method comprising:
receiving a load percentage of an uninterruptible power supply (UPS);
monitoring the load percentage of the UPS to determine whether the UPS is operating in a nominal load state or an overload state based on the load percentage;
generating an input overload countdown timer when the UPS is operating in the overload state, the input overload countdown timer providing an estimated time remaining in the overload state based on the load percentage;
generating an output overload countdown timer by applying an envelope filter to the input overload countdown timer by, for each selected interval in a series of intervals:
receiving a count reset threshold for the selected interval;
when a counter is less than or equal to the count reset threshold, outputting a selected value of the input overload countdown timer within the selected interval as a value of the output overload countdown timer, wherein the selected value is a minimum value or a maximum value of the input overload countdown timer within the selected interval; and
when the counter is greater than the count reset threshold, outputting the selected value of the input overload countdown timer and reset the counter for a subsequent interval of the series of intervals; and
directing a display device to display the output overload countdown timer.

10. The method of claim 9, wherein the envelope filter is a minimum envelope filter, wherein the selected value associated with the input overload countdown timer is the minimum value of the input overload countdown timer within the selected interval.

11. The method of claim 9, wherein the envelope filter is a maximum envelope filter, wherein the selected value associated with the input overload countdown timer is the maximum value of the input overload countdown timer within the selected interval.

12. The method of claim 9, wherein the envelope filter is a median envelope filter, wherein the selected value associated with the input overload countdown timer is an average of the maximum value and the minimum value of the input overload countdown timer within the selected interval.

13. The method of claim 9, further comprising:
setting the count reset threshold prior to run-time.

14. The method of claim 9, further comprising:
controlling values of the count reset threshold during run-time.

15. The method of claim 14, wherein controlling values of the count reset threshold during run-time comprises:
controlling the values of the count reset threshold during run-time based on a noise measurement of the input overload countdown timer during run-time.

16. A system comprising:
an uninterruptible power supply (UPS);
a display device;
measurement circuitry configured to determine a battery capacity of the UPS; and
a controller configured to:
receive the battery capacity of the UPS from the measurement circuitry;
generate an input countdown timer, the input countdown timer providing an estimated battery time remaining based on the battery capacity;

generate an output countdown timer by applying an envelope filter to the input countdown timer by, for each selected interval in a series of intervals:

receive a count reset threshold for the selected interval; and when a counter is less than or equal to the count reset threshold, output a selected value of the input countdown timer within the selected interval as a value of the output countdown timer, wherein the selected value a minimum value or a maximum value of the input countdown timer within the selected interval; and when the counter is greater than the count reset threshold, output the selected value of the input countdown timer and reset the counter for a subsequent interval of the series of intervals; and at least one of direct the display device to display the output countdown timer or control one or more additional components based on the output countdown timer.

17. The system of claim 16, wherein the envelope filter is at least one of a minimum envelope filter, a maximum envelope filter, or a median envelope filter.

18. The system of claim 16, wherein the count reset threshold is set prior to run-time.

19. The system of claim 16, wherein the controller further controls values of the count reset threshold during run-time.

20. The system of claim 19, wherein the controller controls the values of the count reset threshold during run-time based on a noise measurement of the input countdown timer.

* * * * *